(12) United States Patent
Yang et al.

(10) Patent No.: US 6,239,209 B1
(45) Date of Patent: May 29, 2001

(54) AIR CURABLE WATER-BORNE URETHANE-ACRYLIC HYBRIDS

(75) Inventors: Shi Yang, Cary; Glenn Petschke, Raleigh, both of NC (US)

(73) Assignee: Reichhold, Inc., Durham, NC (US)

( * ) Notice: Subject to any disclaimer, the term of this patent is extended or adjusted under 35 U.S.C. 154(b) by 0 days.

(21) Appl. No.: 09/256,644

(22) Filed: Feb. 23, 1999

(51) Int. Cl.[7] .............................. C08J 3/00; C08K 3/20; C08L 75/00
(52) U.S. Cl. .................... 524/507; 524/457; 524/539; 524/589; 524/590; 524/591; 524/839; 524/840; 525/123; 525/127; 525/128; 525/131; 525/455; 525/903; 525/920
(58) Field of Search ..................... 524/507, 539, 524/589, 590, 591, 839, 840, 457; 525/123, 455, 127, 128, 131, 903, 920

(56) References Cited

U.S. PATENT DOCUMENTS

| | | |
|---|---|---|
| 3,684,759 | 8/1972 | Reiff et al. .............. 260/29.6 NR |
| 4,066,591 | 1/1978 | Scriven et al. ........... 260/29.2 TN |
| 4,147,679 * | 4/1979 | Scriven et al. ................. 524/839 |
| 4,277,380 | 7/1981 | Williams et al. ............ 260/18 TN |
| 4,310,449 | 1/1982 | Reischl ..................... 260/29.6 NR |
| 4,318,833 | 3/1982 | Guagliardo ..................... 524/591 |
| 4,408,008 | 10/1983 | Markusch ....................... 524/591 |
| 4,499,233 | 2/1985 | Tetenbaum et al. ............ 524/591 |
| 4,507,431 | 3/1985 | Stutz et al. ..................... 524/840 |
| 4,528,363 | 7/1985 | Tominaga ....................... 528/370 |
| 4,554,308 | 11/1985 | Russiello ....................... 524/591 |
| 4,644,030 | 2/1987 | Loewrigkeit et al. .......... 524/457 |
| 4,730,021 | 3/1988 | Zom et al. ..................... 524/457 |
| 4,745,151 | 5/1988 | Noll et al. ...................... 524/591 |
| 4,764,553 | 8/1988 | Mosbach et al. ............... 524/591 |
| 4,806,611 | 2/1989 | Hönel et al. ..................... 528/45 |
| 4,808,658 | 2/1989 | Walz et al. ..................... 524/502 |
| 4,920,172 | 4/1990 | Daoud ............................ 524/502 |
| 4,927,876 | 5/1990 | Coogan et al. ................. 524/457 |
| 5,034,435 | 7/1991 | Squiller et al. ................. 523/415 |
| 5,104,928 | 4/1992 | Craun et al. ................... 524/773 |
| 5,116,901 | 5/1992 | Biale ............................. 524/457 |
| 5,137,961 | 8/1992 | Goos et al. .................... 524/457 |
| 5,141,983 * | 8/1992 | Hasegawa et al. ............. 524/457 |
| 5,169,719 | 12/1992 | Balatan . | |
| 5,169,895 | 12/1992 | Coogan et al. ................. 524/591 |
| 5,173,526 | 12/1992 | Vijayendran et al. .......... 524/457 |
| 5,229,433 | 7/1993 | Schunck et al. ................. 522/96 |
| 5,242,716 | 9/1993 | Iwase et al. .................. 427/407.1 |
| 5,371,133 | 12/1994 | Stanley .......................... 524/457 |
| 5,494,980 | 2/1996 | Buter et al. .................... 525/455 |
| 5,521,246 | 5/1996 | Tien et al. ..................... 525/455 |
| 5,571,857 | 11/1996 | Gruber et al. .................. 524/457 |
| 5,594,065 | 1/1997 | Tien et al. ..................... 524/507 |
| 5,652,291 | 7/1997 | Oshita et al. ................... 524/457 |
| 5,691,425 | 11/1997 | Klein et al. .................... 525/455 |
| 5,719,227 | 2/1998 | Rosengberry et al. .......... 524/590 |

* cited by examiner

Primary Examiner—Patrick D. Niland
(74) Attorney, Agent, or Firm—Myers Bigel Sibley & Sajovec P.A.

(57) ABSTRACT

The polyurethane-acrylic hybrid interpenetrating polymer network is formed by blending a polyurethane prepolymer having acid or amine salt forming groups, air curable ethylenic unsaturation and terminal isocyanate groups or both terminal isocyanate groups and terminal vinyl groups, with one or more vinyl monomers, inert to isocyanate functionality, dispersing the prepolymer/vinyl monomer blend into water, chain extending the terminal isocyanate groups of the prepolymer with one or more active hydrogen containing compound, and reacting the vinyl monomers by free radical polymerization.

71 Claims, No Drawings

AIR CURABLE WATER-BORNE URETHANE-ACRYLIC HYBRIDS

BACKGROUND OF THE INVENTION

This invention relates to polyurethane polymers, particularly air curable water-borne urethane-acrylic hybrid polymers, and more particularly, air curable water borne urethane-acrylic hybrid polymers suitable for coatings.

It is known in the coating industry that polyurethane coatings exhibit excellent resistance to abrasion, chemicals and solvents, are highly flexible and durable. Conventional oil modified urethanes prepared in organic solvents such as aliphatic hydrocarbons are applied as clear or pigmented coatings. Once applied, the solvent evaporates and the film is crosslinked by air oxidation through the ethylenic unsaturation in the oil. A major application for these coatings has been as clear coatings for wood flooring. Higher solids versions of these coatings are less polluting than their conventional counterparts that often have high VOC levels; however, there is some compromise in performance, particularly dry rate and hardness.

An alternative to limit VOC's, yet maintain performance, is to use water dispersible polyurethanes. For example, water-borne anionically stabilized polyurethanes are made by the reaction of polyalcohols and dihydroxy carboxylic acid with an excess of diisocyanate to produce an NCO terminated carboxy functional prepolymer. This prepolymer is neutralized with a tertiary amine to form salt groups and dispersed into water. The terminal NCO groups are then reacted with active hydrogen containing compounds having functionalities of two or more and reactivities greater than that of water to produce a fully reacted polyurethane polymer. To facilitate manufacture, the prepolymer is typically made in the presence of a solvent that is either left in the dispersion, or removed as one of the last steps in production to provide a solvent-free product. If the solvent is left in the dispersion the typical solvent used is N-methyl pyrrolidinone. If the solvent is to be removed, a more volatile solvent is employed such as acetone or methyl ethyl ketone. As alternatives to the preferred anionic stabilizing group, water dispersible polyurethane polymers may be prepared containing cationic stabilizing groups or non-ionic stabilizing groups to facilitate water dispersibility. For the most part these polymers are linear and their films vary from hard and relatively inflexible to soft and highly flexible. The applications for these water-borne urethane polymers include clear and pigmented coatings for concrete, metal, wood, semi-rigid and flexible plastics, rubber and leather; glass fiber sizing, printing inks and adhesives.

U.S. Pat. Nos. 4,066,591 and 4,147,679, to Scriven et al., propose that water-borne polyurethanes can be prepared from NCO terminated urethane prepolymers containing air curable ethylenic unsaturation and carboxylic functionality. Once dispersed, these prepolymers are chain extended with polyamines, hydrazine, hydrazides or mixtures thereof. While these dispersions do contain some air curable ethylenic unsaturation they are still ensentially linear and even when crosslinked by air oxidation of the ethylenic unsaturation they are unable to provide the necessary mar, scuff and chemical resistance for applications such as coatings for wood flooring.

As previously mentioned, water-borne polyurethane polymers are for the most part linear, producing films with poorer chemical resistance than the highly crosslinked films of two component solvent-borne urethane systems. Pre-crosslinking of the water-borne polyurethane polymers by incorporation of a significant amount of monomer(s) having functionalities greater than two in the prepolymer stage results in highly viscous prepolymers that can not be dispersed. Sufficient pre-crosslinking of the prepolymer in the dispersion stage by means of chain extenders having functionalities greater than two can result in significant polymer gel. For improved chemical resistance, anionically stabilized water-borne polyurethane polymers are typically formulated with a second component to effect post crosslinking. The term "post crosslinking" refers to a chemical reaction designed to occur during and after application of the film. Typical crosslinking agents for anionically stabilized water-borne urethanes include polyaziridine, carbodiimide and epoxies. Once the volatile neutralizing amine has evaporated from the film the polyaziridine reacts with the acid group on the urethane polymer backbone. This reaction occurs at amibient temperature while in the case of carbodiimide and epoxy crosslinking, elevated temperatures are necessary to effect complete cure. A major deficiency of these crosslinking technologies is the limited pot-life. Dispersions containing sufficient residual hydroxyl groups may be formulated in conjunction with melamine into single package systems that are stable at room temperature, however, elevated temperatures are required to effect crosslinking.

Blending of acrylic emulsions with water-borne polyurethanes has been used as a means to reduce coating costs, however, there is some compromise in performance such as chemical resistance. U.S. Pat. No. 4,644,030 to Loewrigkeit et al. proposes that non-self crosslinkable, essentially emulsifier free aqueous polyurethane dispersions can be prepared by producing an NCO terminated carboxylic acid functional prepolymer in the presence of inert liquid vinyl monomer(s). The carboxylic acid group of the prepolymer is neutralized with a volatile amine and the blend dispersed into water. This neutralized, dispersed NCO terminated prepolymer is then chain extended with one or more active hydrogen containing compounds such as polyamines, hydrazine and hydrazides. This dispersion consisting of polyurethane polymer and vinyl monomer(s) is then subjected to free radical polymerization. While dispersions of this type may be essentially free of any cosolvent and emulsifier and lower in raw material costs compared to pure polyurethane dispersions, the polymer is essentially linear and, thus, does not provide sufficient chemical resistance in the absence of any second component crosslinking agents mentioned previously.

U.S. Pat. No. 5,571,857 to Gruber et al. proposes that solvent free urethane/acrylic hybrid polymers can be made by reaction of an excess of isophorone diisocyanate with polyol(s) and dihydroxy carboxylic acid. The resulting NCO terminated carboxylic acid functional prepolymer is blended with vinyl monomer(s) to reduce the viscosity. A tertiary amine is then added to neutralize the acid groups and the blend dispersed into water. The NCO terminated urethane prepolymer is then chain extended with a blend of mono and diamines followed by free radical polymerization of the vinyl monomer(s). As with U.S. Pat. No. 4,644,030, to Loewrigkeit these polymers are essentially linear and, chain termination is due to the use of mono-amine limits the molecular weight. These polymers are solvent and emulsifier free, however, in the absence of a second component, the chemical resistance is insufficient for coatings applications.

It is proposed in U.S. Pat. No. 5,521,246 to Tien et al. that a room temperature self-crosslinkable aqueous dispersion can be prepared by first producing an NCO-terminated carboxyl functional polyurethane prepolymer, adding vinyl monomers a portion of which is glycidyl methacrylate, neutralizing the carboxyl groups with a tertiary amine, dispersing the mixture into water, adding an oil-soluble free radical initiator, polymerizing the vinyl monomers and chain extending the urethane with water. Since the epoxy group is hydrophilic and reaction catalyzed by the presence of tertiary amines, the stability of these dispersions is questionable particularly at elevated temperatures.

Ketone-hydrazide crosslinking technology involving two distinct polymers is disclosed in U.S. Pat. No. 5,141,983 to Hasegawa et al. This type system consists of an acrylic polymer containing ketone functionality and a urethane polymer that contains hydrazide terminal groups or amido groups. After mixing, application and removal of water and neutralizing agent, a chemical bond is formed between these two distinct polymers resulting in a film with improved solvent resistance over simple blends. The removal of water from these films is highly dependent on the temperature and humidity. Thus, to ensure complete ketone-hydrazide reaction, an elevated temperature is generally required. While providing some improvement in performance, incorporation of both air curable ethylenic unsaturation and ketone-hydrazide crosslinking technologies into a single coating system offers a higher degree of crosslinking and this crosslinking is not as dependant on complete removal of water.

SUMMARY OF THE INVENTION

It is an object of the present invention to provide a stable and self-crosslinkable oil modified polyurethane-acrylic dispersion.

It is another object of the present invention to provide an air curable polyurethane-acrylic dispersion that dries rapidly at room temperature and can produce a crosslinked coating.

It is still another object of the present invention to provide an air curable polyurethane-acrylic dispersion that is resistant to abrasions, chemicals and stains.

These and other objects, features and advantages are achieved by the various polyurethane-acrylic dispersions of the invention. In one embodiment the polyurethane-acrylic dispersion is an air curable water-borne polyurethane-acrylic hybrid interpenetrating polymer network. The interpenetrating polymer network is a first polymer network intertwined on a molecular scale with a second polymer network. The polyurethane-acrylic hybrid interpenetrating polymer network is formed by blending a polyurethane prepolymer having salt forming groups, air curable ethylenic unsaturation and terminal isocyanate groups or both terminal isocyanate groups and terminal vinyl groups, with one or more vinyl monomers inert to isocyanate functionality; dispersing the prepolymer/vinyl monomer blend into water; chain extending the terminal isocyanate groups of the prepolymer with one or more active hydrogen containing compound; and reacting the vinyl monomers by free radical polymerization.

In another embodiment, the present invention relates to an air curable water-borne polyurethane-acrylic hybrid copolymer. The copolymer is formed by blending a polyurethane prepolymer having salt forming groups, air curable ethylenic unsaturation terminal isocyanate groups, with one or more vinyl monomers inert to isocyanate functionality; reacting the terminal isocyanate groups of the prepolymer with one or more vinyl monomers having an active hydrogen group to chain stop the prepolymer; dispersing the chain stopped prepolymer/vinyl monomer blend into water; and reacting the urethane prepolymer terminal vinyl groups and one or more vinyl monomers by free radical polymerization.

In yet another embodiment, the present invention provides a dual curable water-borne polyurethane-acrylic hybrid formed by blending a polyurethane prepolymer having salt forming groups, air curable ethylenic unsaturation and terminal isocyanate groups, with one or more vinyl monomers inert to isocyanate functionality, a portion of which contain ketone functionality; dispersing the prepolymer-acrylic monomer blend into water; reacting the dispersed prepolymer with an excess of dihydrazide groups; and reacting the vinyl monomer by free radical polymerization.

DETAILED DESCRIPTION OF THE INVENTION

As summarized above, the present invention provides a water-borne polyurethane/acrylic hybrid interpenetrating polymer network or copolymer. The polyurethane/acrylic hybrid interpenetrating polymer is formed by providing a polyurethane prepolymer having acid or amine salt forming groups, air curable ethylenic unsaturation and terminal vinyl groups and blending with one or more vinyl monomers which are inert to isocyanate functionality. Alternatively, a copolymer can be formed by blending acid or amine salt forming groups, air curable ethylenic unsaturation and terminal vinyl groups with the one or more vinyl monomers inert to isocyanate functionality. In another embodiment, a dual cure system is utilized.

In the case of all three systems, namely the interpenetrating polymer network system, the copolymer system and the dual cure system, formation of a polyurethane prepolymer having salt forming groups, air curable ethylenic unsaturation and terminal isocyanate groups is required. This prepolymer is the reaction product of an organic polyisocyanate, active hydrogen containing material which has acid or amine salt forming groups and an active hydrogen containing material(s), a portion of which has air curable ethylenic unsaturation functionality. Particularly suitable organic polyisocyanates for forming the polyurethane prepolymer include 1,4-tetramethylene diisocyanate, 1,6-hexamethylene diisocyanate, 2,2,4-trimethyl-1,6-dissocyanatohexane, 1,10-decamethylene diisocyanate, 1,4-cyclohexylene diisocyanate, bis (4-isocyanatocyclohexyl) methane, 1-isocyanato-3-isocyanatomethyl-3,5,5-trimethyl-cyclohexane, m- and p-phenylene dissocyanate, 2,6- and 2,4-tolylene diisocyanate, xylene diisocyanate, 4-chloro-1,3-phenylene diisocyanate, 4,4'-biphenylene diisocyanate, 4,4'-methylene diphenylisocyante, 1,5-naphthylene diisocyanate, 1,5-tetrahydronaphthylene diisocyanate, polymethylene polyphenylisocyanates, 1,12-dodecyl diisocyanate, norbornane diisocyanate, 2-methyl-1,5-pentane diisocyanate and mixtures thereof.

The term "active hydrogen containing compound" relates to a compound having hydrogens which, because of their position in the molecule, display activity according to the Zerewitinoff test. Active hydrogen include hydrogen atoms attached to oxygen, nitrogen, or sulfur, and thus useful compounds will include those having at least two of these groups (in any combination)—OH, —SH, and—NH—. The moieties attached to each group can be aliphatic, aromatic, cycloaliphatic or of a mixed type not including carbonyl, phosphonyl or sulfonyl linkages such as described in U.S. Pat. No. 4,147,679 to Scriven et al. the disclosure of which is incorporated herein by reference in its entirety.

Acid salt forming groups are introduced into the prepolymer by reacting polyisocyanate compounds with a compound containing active hydrogen and active acid groups neutralized by a neutralizing base. Suitable compounds having active hydrogen and active acid groups include hydroxy and mercapto carboxylic acids, aminocarboxylic acids, aminohydroxy carboxylic acids, sulfonic acids, hydroxy sulfonic acids and aminosulfonic acids. Suitable neutralizing bases include inorganic bases such as sodium hydroxide, potassium hydroxide, lithium hydroxide, ammonia, triethylamine and dimethyl ethanol amine.

Basic salt forming groups are introduced into the prepolymers by reacting a suitable compound containing active hydrogen groups and active basic groups neutralized with an acid. Suitable compounds having active hydrogen groups and active basic groups include aliphatic, cycloaliphatic and hetercyclic amino alcohols, diols and triols; amines, diamines, triamines, tetramines and amides. Suitable neutralizing acids include organic acids such as formic acid and acetic acid, and inorganic acids such as hydrochloric acid and sulfuric acid.

The air curable ethylenic unsaturation can be provided by an ester polyol made by reaction of an aromatic or aliphatic polyol containing at least two hydroxyl groups per molecule with a fatty acid wherein a portion of the fatty acid is unsaturated. Suitable polyols include ethylene glycol, ethylene glycol, propylene glycol, 1,3 propane diol, 1,3 butylene glycol, 1,4 butane diol, Bisphenol A, trimethylol propane, trimethylol ethane, pentaerythritol, glycerin, neopentyl glycol, and cyclohexane dimethanol, and mixtures thereof. Suitable unsaturated fatty acids include linoleic, palmitoleic, linolenic, eleostearic, arachidonic, ricinoleic acids, 10,12-octadecadienoic acid, and mixtures thereof.

The air curable ethylenic unsaturation can also be provided by transesterification of an oil with an aromatic or aliphatic polyol containing at least two hydroxyl groups per molecule. Suitable oils include linseed oil, soybean oil, safflower oil, tall oil, sunflower oil, dehydrated caster oil, tung oil, sardine oil, olive oil, cottonseed oil and mixtures thereof. Suitable polyols include ethylene glycol, proplylene glycol, 1,3 propane diol, 1,3 butylene glycol, 1,4 butane diol, Bisphenol A, trimethylol propane, trimethylol ethane, pentaerythritol, glycerin, neopentyl glycol, and cyclohexane dimethanol, and mixtures thereof. The reaction of the polyol and fatty acid or oil can be catalyzed by transesterification catalysts such as calcium naphthenate, lithium neodecanoate, zinc acetate, tin oxide and the like. A color stabilizer such as trisnonyl phenyl phosphite may also be added. Other polyols include polycarbonate, polyester, polyether, and acrylic polyols.

The polyurethane prepolymer may be partially (interpenetrating polymer network system) or completely, (copolymer system) reacted with vinyl monomer(s) that contain both vinyl and active hydrogen functionality such as hydroxy ethyl acrylate, hydroxy ethyl methacrylate, hydroxy propyl acrylate, hydroxy propyl methacrylate resulting in a vinyl terminated polyurethane prepolymer.

Vinyl monomers employed, that are inert to isocyanate functionality include acrylic acid, methacrylic acid, ethyl acrylate, butyl acrylate, methyl methacrylate, ethyl methacrylate, butyl methacrylate, acrylamide, methylacrylamide, styrene and vinyl toluene. In the case of the dual curing system a portion of these vinyl monomer(s) must include some that contains at least 0.5% by weight of ketone group functionality such as diacetone acrylamide.

The prepolymer/vinyl monomer blend is next dispersed into water and suitable active hydrogen containing compounds added to react with the prepolymer terminal isocyanate groups for chain extension, in the case of the interpenetrating polymer network system, where a dual cure system is used, chain termination occurs. Such active hydrogen containing compounds include aliphatic, aromatic, cycloaliphatic and hetercyclic amino alcohols, polyamines, hydrazine, substituted hydrazines, hydrazides, amides, water and mixtures thereof. In the case of the dual cure system, dihydrazides such as ethylene-1,2-dihydrazide, propylene-1,3-dihydrazide, propylene-1,4-dihydrazide and adipic dihydrazide are preferred.

The polyurethane prepolymer/vinyl monomer(s) blend is then subjected to free radical polymerization, preferably utilizing the addition of an azo compound.

While coatings based on these polymers will eventually crosslink by air oxidation, like their solvent-borne counterparts, this reaction can be sped up by the introduction of a small amount of catalyst or drier. The preferred driers are metallic carboxylates such as cobalt and manganese, specifically modified for water-borne systems. These driers are very effective in facilitating the air oxidative cure of these polymers. The air oxidative crosslinking mechanism involves the absorption of oxygen, formation and decomposition of peroxides and finally polymerization.

The coating may also can contain other ingredients such as plasticizers, pigments, colorants, dyes, surfactants, thickeners, heat stabilizers, leveling agents, anti-cratering agents, fillers, sedimentation inhibitors, ultraviolet-light absorbers, and the like to modify properties. Additives such as promoters, heat stabilizers, ultraviolet-light absorbers, etc., can be intimately dispersed in the reaction mixture and apparently thereby become an integral part of the urethane polymer. Alternatively, the additive may be introduced after the urethane polymer has been formed, in which case the additives can be incorporated on the surface of the polymer or dispersed in the aqueous medium. The resulting urethane coating composition has improved mar and scuff resistance properties, and is air dryable, has a high hardness and is resistant to abrasions, chemicals, and stains.

EXAMPLES

The following examples illustrate specific embodiments of the present invention. In the examples and throughout the specification, all parts and percentages are by weight, unless otherwise indicated.

Example 1

Synthesis of Hydroxy Function oil-ester

A hydroxy function oil-ester is prepared by charging 1000 parts of soybean oil, 138.4 parts of pentaerythritol (mono PE) and 2.3 parts of calcium (8%) naphthenate into a clean dry flask equipped with an agitator, thermometer, nitrogen inlet and condenser. The reaction mixture is stirred and heated to 250 C under a dry nitrogen atmosphere and then maintained at this temperature for two hours. The oil-ester is then cooled to 50° C. and 2.85 parts of tris nonyl phenyl phosphite color stabilizer added. The resulting oil-ester has an acid value of 0.6 and a hydroxyl value of 190. All of the hydroxyl function oil esters used in this invention are prepared in a similar manner.

Example 2

Preparation of low Temperature Crosslinkable polyurethane-acrylic hybrid copolymer a) Preparation of acrylic monomer containing oil-modified urethane dispersion Into a clean dry flask equipped with an agitator, thermometer, nitrogen inlet and outlet tubes is charged 50 parts of above oil-ester intermediate (Example 1), 50 parts of a hexane diol neopentyl glycol adipic acid polyester polyol (Rucoflex S 1019-120), 26 parts of dimethylol propionic acid (DMPA), 65 parts of N-methyl pyrrolidinone (NMP) cosolvent and 86.6 parts of toluene diisocyanate (TDI). The ingredients are stirred and heated to 80 C under a dry nitrogen atmosphere and then maintained at this temperature until the NCO content reaches the theoretical value. This reaction typically requires 1 to 2 hours to complete. After the NCO content reaches the theoretical value, 0.3 parts, 4-methoxy phenol (MEHQ) are added and then 46.2 parts of hydroxy ethyl acrylate are added to terminate the oil-modified urethane prepolymer and sparging with dry air to prevent premature free radical polymerization begun. The reaction mass is held at 60° C. until all of the isocyanate groups are consumed (confirmed by IR). Once all of the isocyanate groups are consumed, a mixture of 220 parts of styrene, 125 parts of butyl acrylic (BA) and 19.6 parts of triethylamine (TEA) are added. The blend is mixed for 15 minutes at 60° C. and then 650 parts of this blend is dispersed into 710 parts of water under agitating.

b) Preparation of a crosslinkable waterborne polyurethane-acrylic hybrid copolymer.

The above acrylic monomer-containing oil-modified urethane dispersion is heated to 75° C. under a nitrogen atmosphere, and a mixture of 0.58 parts of 2,2-azo bis (2,4-dimethyl valeronitrile [Vazo-52] in 1 part of NMP and 4 parts of dipropylene glycol mono propyl ether (Dowanol DPM) are added drop-wise into the dispersion over a period of 60 minutes to initiate the free radical reaction. Once the addition of the initiator is complete, the dispersion is maintained at 75 to 80° C. for another 30 minutes. A solution of 0.3 parts of t-butyl hydroperoxide (t-BHP) in 1 part of water and a solution of 0.15 parts of AWC in 1 part of water are added separately into the dispersion. After another 30 minutes at 80° C., a solution of 0.3 parts of t-BHP in 1 part of water and a solution of 0.15 parts of hydrosulfite powder (AWC) in 1 part of water are added separately to increase the monomer conversion to polymer. The amount of conversion is estimated by measuring the non-volatile (NV) content of the dispersion. The final hybrid dispersion has a NV of 42.2%, pH value of 7.11 and viscosity of 1352 cps at 25 C. (3 564-2).

c) Formulation and testing of the low temperature crosslinkable oil-modified urethane-acrylic hybrid copolymer varnish.

250 parts of above resin (Example 2b) is formulated into a 39% solids varnish by adding 0.53 parts of Manganese (9%) HYDRO-CURE® III and 20 parts of water under agitation. A 5.4 mil wet film is then applied to a cold rolled steel (CRS) panel and allowed to dry at room temperature for 7 days. The film is then tested for chemical resistance and resistance to isopropanol. For comparison, a film of this same resin solution, without drier was also tested. The results are shown in the following table (3564-31).

| Chemical Resistance[1] | Resin | Varnish |
|---|---|---|
| water | 3 | 4 |
| coffee | 3 | 5 |
| tea | 3 | 4 |
| mustard | 3 | 3 |
| dye | 2 | 4 |
| 409 ® Cleaner | 3 | 5 |
| WINDEX ® | 3 | 5 |
| ammonia solution | 4 | 5 |
| Average | 3.00 | 4.40 |
| Isopropanol, dbl rubs[2] | >100 | >100 |
| 3472– | 2 r | 2 v |

[1]ASTM D-1308, 4 hr exposure, rating 0–5 no effect
[2]ASTM D-5402

Example 3

Preparation of low Temperature Crosslinkable oil-modified polyurethane-acrylic Hybrid Interpenetrating Polymer network.

a) Preparation of acrylic monomer containing oil-modified urethane dispersion.

Into a clean dry flask equipped with an agitator, thermometer, nitrogen inlet and outlet tubes is charged 40 parts of oil-ester prepared in a manner as described in Example 1 except using linseed oil, 40 parts of hexane diol neopentyl glycol adipic acid polyester polyol (Ruco S1019-120 polyol), 31 parts of DMPA, 70 parts of NMP cosolvent and 111.9 parts of methylene bis (4-cyclohexyl isocyanate). The ingredients are stirred and heated to 95° C. under a dry nitrogen atmosphere and then maintained at this temperature until the NCO content reaches the theoretical value. The prepolymer is then cooled to 70° C. and a mixture of 192 parts of MMA, 164 parts of BA and 23.4 parts of TEA are added into the oil-modified urethane prepolymer. The mixture is cooled to 52° C., mixed for 10 minutes then 650 parts of this mixture dispersed into 800 parts of water under agitation. The dispersed oil-modified urethane prepolymer is then chain extended by adding a solution consisting of 2.23 parts of ethylenediamine (EDA), 2.55 parts of diethylene triamine (DETA) and 75 parts of water resulting in a stable acrylic monomer/oil-modified urethane-urea dispersion.

b) Preparation of waterborne oil-modified polyurethane/ acrylic hybrid interpenetrating polymer network.

The above acrylic monomer/oil-modified urethane-urea dispersion is heated to about 75° C. under a nitrogen atmosphere, and a mixture of 0.7 parts of Vazo-52 in 9 parts of NMP is added dropwise into this dispersion over a period of 50 minutes. Once half of this initiator solution is added, a mixture of 95 parts of MMA and 81 parts of BA is fed into the dispersion through a separate dropping funnel over a period of 30 minutes. The dispersion temperature is maintained at 75 to 80° C. Once the Vazo-52 addition is complete, a solution of 0.4 parts of AWC in 5 parts of water is added dropwise into the dispersion over a period of 25 minutes. The reaction mass is held at 80° C. for an additional 25 minutes and then a solution of 0.5 parts of t-BHP in 3 parts of water and a solution of 0.25 parts of AWC in 3 parts of water are added separately into the dispersion to increase the monomer conversion. The final dispersion has a non-volatile of 43.2%, pH value of 7.88 and viscosity of 3008 cps at 25° C. (3472-87).

c) Formulation and testing of the low temperature crosslinkable oil-modified urethane-acrylic hybrid interpenetrating polymer network (IPN) varnish.

200 parts of the above resin (Example 3b) are combined with 0.43 parts of Manganese (9%) HYDRO-CURE® III and 27 parts of water to produce a 38% solids varnish. Films were applied to CRS panels and tested after 7 days for chemical resistance and resistance to isopropanol as previously described in Example 2. The test results are shown in the following table.

| Chemical Resistance[1] | Resin | Varnish |
|---|---|---|
| water | 3 | 5 |
| coffee | 2 | 4 |
| tea | 2 | 3 |
| mustard | 4 | 4 |
| dye | 2 | 2 |
| 409 ® Cleaner | 4 | 4 |
| WINDEX | 5 | 4 |
| ammonia solution | 4 | 4 |
| Average | 3.25 | 3.75 |
| isopropanol, dbl rubs[2] | 80 | >100 |
| 3472– | 87 r | 87 v |

[1]ASTM D-1308, 4 hr exposure, rating 0–5 no effect
[2]ASTM D-5402

Example 4

Synthesis of Hydroxyl Function oil alkyd

A hydroxy function alkyd is synthesized by charging 961 parts of a hydroxy functional linseed oil ester having a hydroxyl value of 180, 122 parts of phthalic anhydride and 0.5 parts of butyl stannoic acid (Fascat 4100) catalyst into a clean dry flask equipped with an agitator, thermometer, nitrogen inlet, condenser and water trap. The reaction mixture is stirred and heated to 240° C. under a dry nitrogen atmosphere and then held at this temperature until the acid value drops to below 1.0. The resulting alkyd intermediate has an acid value of 0.8 and a hydroxyl value of 193.

Example 5

Preparation of low Temperature Crosslinkable uralkyd-acrylic hybrid Interpenetrating Polymer network.

a) Preparation of acrylic monomer containing uralkyd dispersion.

Into a clean dry flask equipped with an agitator, thermometer, nitrogen inlet and outlet tubes is charged 105 parts of above intermediate (Example 4), 25 parts of DMPA, 65 parts of NMP, 175 parts of styrene, 90 parts of BA, 0.25 parts of MEHQ and 56.8 parts of methylene diphenyl isocyanate (MDI). The ingredients are stirred and heated to 70° C. and sparged with dry air. The reaction is maintained at 70° C. until all of the isocyanate groups are consumed. The uralkyd solution is cooled to 60° C. and then 18.84 parts of TEA are added. After 20 minutes mixing, 500 parts of this mixture are dispersed into 525 parts of water with agitation (3564-2 1).

b) Preparation of waterborne uralkyd-acrylic hybrid interpenetrating polymer network.

The above dispersion (Example 5a) is heated to 75° C. under a nitrogen atmosphere, and a solution of 0.25 parts of Vazo-52 in 2.5 parts of NMP is added into this dispersion. The temperature is controlled at 80° C. for 30 minutes and then another solution of 0.25 parts of Vazo-52 in 2.5 parts of NMP is added dropwise into the dispersion over a period of 15 minutes. After checking the non-volatile content, a solution of 0.2 parts of Vazo-52 in 1.5 parts of NMP is added into the dispersion. After holding another 40 minutes, a solution of 0.4 parts of t-BHP in 2 parts of water and a solution of 0.2 parts of AWC in 1 parts of water are added into the dispersion separately. After 1 hour holding, the dispersion has a solids content of 41.5%, pH of 7.55 and viscosity of 180 cps at 25 C (3564-21).

c) Formulation and testing of the low temperature crosslinkable uralkyd/acrylic hybrid interpenetrating polymer network (IPN) varnish.

A 35% solids varnish is prepared by mixing 200 parts of the above resin with 0.42 parts of Manganese (9%) HYDRO-CURE® III and 12.5 parts of water with agitation. Films were applied to CRS panels and after 7 days the films were tested for chemical resistance and solvent resistance as described in the Example 2. The results are shown in the following table.

| Chemical Resistance[1] | Resin | Varnish |
|---|---|---|
| water | 3 | 2 |
| coffee | 3 | 3 |
| tea | 3 | 4 |
| mustard | 3 | 4 |
| dye | 3 | 4 |
| 409 ® Cleaner | 3 | 4 |
| WINDEX ® | 3 | 4 |
| ammonia solution | 3 | 3 |
| Average | 3.00 | 3.50 |
| isopropanol, dbl rubs[2] | 50 | 80 |
| 3472– | 21 r | 21 v |

[1]ASTM D-1308, 4 hr exposure, rating 0–5 no effect
[2]ASTM D-5402ASTM

Example 6

Preparation of low Temperature Dual Crosslinkable Oil-modified polyurethane-acrylic hybrid Preparation of acrylic monomer containing oil-modified urethane dispersion.

Into a clean dry flask equipped with an agitator, thermometer, nitrogen inlet and outlet tubes is charged 50 parts of am oil ester as described in Example 1 except using linseed oil, 27 parts of DMPA, 60 parts of NMP, 106 parts of MDI. The ingredients are stirred and heated to 70° C. under dry nitrogen. The reaction is maintained at 70° C. until the theoretical NCO content is reached. Once the theoretical NCO content the nitrogen blanket is discontinued, sparging with dry air begun. To this dispersion is then added 0.2 parts of MEHQ 203 parts of styrene, 125 parts BA and 9.35 parts of HEA are added and the reaction mass reheated to 70° C. for 1 hour. The mass is cooled to 60° C. and 20 parts of diacetone acrylamide added followed by 20 parts of TEA. The blend is mixed for 15 minutes at 60° C. and then 630 parts of this blend are dispersed into 710 parts of water and 13.15 parts of adipic dihydrazide under agitating (3564-16).

b) Preparation of waterborne-acrylic hybrid interpenetrating polymer network.

The above dispersion (Example 6a) is slowly heated to 80° C. and half of Solution A consisting of 0.5 parts of Vazo-52 in S parts of NMP is added dropwise over one hour. The temperature is held at 80° C. for 60 minutes, and then the other half of solution A added dropwise over a period of 10 minutes. After checking the non-volatile content, a solution of 0.2 parts of Vazo-52 in 2 parts of NMP is added dropwise over a period of 60 minutes. The dispersion was cooled and analyzed for solids content of 41.5%, pH of 7.59 and viscosity of 2224 cps at 25 C(3 564-16).

c) Formulation and testing of the low temperature dual crosslinkable water-borne oil modified polyurethane-acrylic hybrid varnish.

A 39% solids varnish is prepared by mixing 200 parts of the above resin with 0.43 parts of Manganese (9%) HYDRO-CURE® III and 12.5 parts of water with agitation. Films were applied to CRS panels and after 7 days the films were tested for chemical resistance and solvent resistance as described in the Example 2. The results are shown in the following table.

| Chemical Resistance[1] | Resin | Varnish |
| --- | --- | --- |
| Water | 5 | 5 |
| Coffee | 5 | 5 |
| Tea | 5 | 5 |
| Mustard | 3 | 4 |
| Dye | 4 | 5 |
| 409 ® Cleaner | 5 | 5 |
| WINDEX ® | 5 | 5 |
| ammonia solution | 4 | 5 |
| Average | 4.50 | 4.88 |
| isopropanol, dbl rubs[2] | >100 | >100 |
| 3564– | 16 r | 16 v |

[1]ASTM D-1 308, 4 hr exposure, rating 0–5 no effect
[2]ASTM D-5402

That which is claimed:

1. An air curable water-borne polyurethane-acrylic hybrid interpenetrating polymer network formed by:
   (a) blending a polyurethane prepolymer having
      (i) acid or amine salt forming groups,
      (ii) air curable ethylenic unsaturation and
      (iii) terminal isocyanate groups or both terminal isocyanate groups and terminal vinyl groups, with one or more vinyl monomers, inert to isocyanate functionality;
   (b) dispersing the prepolymer/vinyl monomer blend into water,
   (c) chain extending the terminal isocyanate groups of the prepolymer with one or more active hydrogen containing compounds; and
   (d) reacting the vinyl monomers by free radical polymerization.

2. The air curable water-borne polyurethane-acrylic hybrid interpenetrating polymer network according to claim 1, wherein the isocyanate groups are selected from the group consisting of 1,4-tetramethylene diisocyanate, 1,6-hexamethylene diisocyanate, 2,2,4-trimethyl-1,6-dissocyanatohexane, 1,10-decamethylene diisocyanate, 1,4-cyclohexylene diisocyanate, bis (4-isocyanatocyclohexyl) methane, 1-isocyanato-3-isocyanatomethyl-3,5,5-trimethyl-cyclohexane, m- and p-phenylene dissocyanate, 2,6- and 2,4-tolylene diisocyanate, xylene diisocyanate, 4-chloro-1, 3-phenylene diisocyanate, 4,4'-biphenylene diisocyanate, 4,4'-methylene diphenylisocyante, 1,5-naphthylene diisocyanate, 1,5-tetrahydronaphthylene diisocyanate, polymethylene polyphenylisocyanates, 1,12-dodecyl diisocyanate, norbornane diisocyanate, 2-methyl-1,5-pentane diisocyanate and mixtures thereof.

3. The air curable water-borne polyurethane-acrylic hybrid interpenetrating polymer network according to claim 1, wherein the acid salt forming group is introduced into the prepolymer by a compound containing active hydrogen and active acid groups neutralized by a neutralizing base.

4. The air curable water-borne polyurethane-acrylic hybrid interpenetrating polymer network according to claim 3, wherein the compound containing active hydrogen and active acid groups is selected from the group consisting of hydroxy and mercapto carboxylic acids, aminocarboxylic acids, aminohydroxy carboxylic acids, sulfonic acids, hydroxy sulfonic acids and aminosulfonic acids.

5. The air curable water-borne polyurethane-acrylic hybrid interpenetrating polymer network according to claim 3, wherein the neutralizing base is an organic or inorganic base selected from the group consisting of sodium hydroxide, potassium hydroxide, lithium hydroxide, ammonia, triethylamine and dimethyl ethanol amine.

6. The air curable water-borne polyurethane-acrylic hybrid interpenetrating polymer network according to claim 1, wherein the amine salt forming group is introduced into the prepolymer by a compound containing active hydrogens and active basic groups neutralized by a neutralizing acid.

7. The air curable water-borne polyurethane-acrylic hybrid interpenetrating polymer network according to claim 6, wherein the compound containing active hydrogen groups and active basic groups is selected from the groups consisting of aliphatic, cycloaliphatic and hetercyclic amino alcohols, diols and triol, amines, diamines, triamines, tetramines and amides.

8. The air curable water-borne polyurethane-acrylic hybrid interpenetrating polymer network according to claim 6, wherein the neutralizing acid is an organic or inorganic acid selected from the group consisting of formic acid, acetic acid, hydrochloric acid and sulfuric acid.

9. The air curable water-borne polyurethane-acrylic hybrid interpenetrating polymer network according to claim 1, wherein air curable ethylenic unsaturation is provided by an ester polyol made by reaction of an aromatic or aliphatic polyol containing at least two hydroxyl groups per molecule with a fatty acid wherein a portion of the fatty acid is unsaturated.

10. The air curable water-borne polyurethane-acrylic hybrid interpenetrating polymer network according to claim 9, wherein the aromatic or aliphatic polyol is selected from the group consisting of ethylene glycol, propylene glycol, 1,3 propane diol, 1,3 butylene glycol, 1,4 butane diol, Bisphenol A, trimethylol propane, trimethylol ethane, pentaerythritol, glycerin, neopentyl glycol, and cyclohexane dimethanol, and mixtures thereof.

11. The air curable water-borne polyurethane-acrylic hybrid interpenetrating polymer network according to claim 9, wherein the unsaturated fatty acid(s) is selected from the group consisting of linoleic, palmitoleic, linolenic, eleostearic, arachidonic, ricinoleic acids, 10, 12-octadecadienoic acids, and mixtures thereof.

12. The air curable water-borne polyurethane-acrylic hybrid interpenetrating polymer network according to claim 1, wherein the air curable ethylenic unsaturation is provided by transesterification of an oil with an aromatic or aliphatic polyol containing at least two hydroxyl groups per molecule.

13. The air curable water-borne polyurethane-acrylic hybrid interpenetrating polymer network according to claim 12, wherein the aromatic or aliphatic polyol is selected from the group consisting of ethylene glycol, propylene glycol, 1,3 propane diol, 1,3 butylene glycol, 1,4 butane diol, Bisphenol A, trimethylol propane, trimethylol ethane, pentaerythritol, glycerin, neopentyl glycol, and cyclohexane dimethanol, and mixtures thereof.

14. The air curable water-borne polyurethane-acrylic hybrid interpenetrating polymer network according to claim 12, wherein the oil is selected from the group consisting of linseed oil, soybean oil, safflower oil, tall oil, sunflower oil, dehydrated caster oil, tung oil, sardine oil, olive oil, cottenseed oil and mixtures thereof.

15. The air curable water-borne polyurethane-acrylic hybrid interpenetrating polymer network according to claim 1, the terminal vinyl groups are provided by one or more vinyl monomers containing both active hydrogen and vinyl functionality.

16. The air curable water-borne polyurethane-acrylic hybrid interpenetrating polymer network according to claim 15, wherein the one or more vinyl monomers containing both active hydrogen and vinyl functionality are selected from the group consisting of hydroxy functional acrylates and methacrylates, amides, and amino functional acrylates and methacrylates.

17. The air curable water-borne polyurethane-acrylic hybrid interpenetrating polymer network according to claim 1, wherein the one or more vinyl monomers inert to isocyanate functionality is selected from the group consisting of acrylic acid, methacrylic acid, ethyl acrylate, butyl acrylate, methyl methacrylate, ethyl methacrylate, butyl methacrylate, acrylamide, methylacrylamide, styrene and vinyl toluene.

18. The air curable water-borne polyurethane-acrylic hybrid interpenetrating polymer network according to claim 1, wherein the active hydrogen containing compounds reacted with the prepolymer terminal isocyanate groups for chain extension are selected from aliphatic, cycloaliphatic and hetercyclic amino alcohols, polyamines, hydrazine, substituted hydrazines, hydrazides, amides, water and mixtures thereof.

19. The air curable water-borne polyurethane-acrylic hybrid interpenetrating polymer network according to claim 1, wherein reaction of the vinyl groups by free radical polymerization includes the addition of an azo compound.

20. An air curable water-borne polyurethane-acrylic hybrid copolymer formed by:
 (a) blending a polyurethane prepolymer having
  (i) acid or amine salt forming groups,
  (ii) air curable ethylenic unsaturation and
  (iii) terminal vinyl groups, with one or more vinyl monomers inert to isocyanate functionality;
 (b) reacting the terminal isocyanate groups of the prepolymer with one or more vinyl monomers having an active hydrogen group to chain stop the prepolymer,
 (c) dispersing the chain stopped prepolymer-vinyl monomer blend into water and
 (d) reacting the polyurethane prepolymer terminal vinyl groups and one or more vinyl monomers by free radical polymerization.

21. The air curable water-borne polyurethane-acrylic hybrid copolymer according to claim 20, wherein the prepolymer diisocyanate is selected from the group consisting of 1,4-tetramethylene diisocyanate, 1,6-hexamethylene diisocyanate, 2,2,4-trimethyl-1,6-dissocyanatohexane, 1,10-decamethylene diisocyanate, 1,4-cyclohexylene diisocyanate, bis (4-isocyanatocyclohexyl) methane, 1-isocyanato-3-isocyanatomethyl-3,5,5-trimethyl-cyclohexane, m- and p-phenylene dissocyanate, 2,6- and 2,4-tolylene diisocyanate, xylene diisocyanate, 4-chloro-1,3-phenylene diisocyanate, 4,4'-biphenylene diisocyanate, 4,4'-methylene diphenylisocyante, 1,5-naphthylene diisocyanate, 1,5-tetrahydronaphthylene diisocyanate, polymethylene polyphenylisocyanates, 1,12-dodecyl diisocyanate, norbornane diisocyanate, 2-methyl-1,5-pentane diisocyanate and mixtures thereof.

22. The air curable water-borne polyurethane-acrylic hybrid copolymer according to claim 20, wherein the acid salt forming group is introduced into the prepolymer by a compound containing active hydrogen and active acid groups neutralized by a neutralizing base.

23. The air curable water-borne polyurethane-acrylic hybrid copolymer according to claim 22, wherein the compound containing active hydrogen and active acid groups is selected from the group consisting of hydroxy and mercapto carboxylic acids, aminocarboxylic acids, aminohydroxy carboxylic acids, sulfonic acids, hydroxy sulfonic acids and aminosulfonic acids.

24. The air curable water-borne polyurethane-acrylic hybrid copolymer according to claim 22, wherein the neutralizing base is an organic or inorganic base selected from the group consisting of sodium hydroxide, potassium hydroxide, lithium hydroxide, ammonia, tertiary amines, triethylamine, and dimethyl ethanol amine.

25. The air curable water-borne polyurethane-acrylic hybrid copolymer according to claim 20, wherein the amine salt forming group is introduced into the prepolymer by a compound containing active hydrogens and active basic groups neutralized by a neutralizing acid.

26. The air curable water-borne polyurethane-acrylic hybrid copolymer according to claim 25, wherein the compound containing active hydrogen groups and active basic groups is selected from the group consisting of aliphatic, cycloaliphatic and hetercyclic amino alcohols, diols and triols, amines, diamines, triamines, tetramines and amides.

27. The air curable water-borne polyurethane-acrylic hybrid copolymer according to claim 25, wherein the neutralizing acid is an organic or inorganic acid selected from the group consisting of formic acid, acetic acid, hydrochloric acid and sulfuric acid.

28. The air curable water-borne polyurethane-acrylic hybrid copolymer according to claim 20, wherein the air curable ethylenic unsaturation is provided by an ester polyol made by reaction of an aromatic or aliphatic polyol containing at least two hydroxyl groups per molecule with a fatty acid wherein a portion of the fatty acid is unsaturated.

29. The air curable water-borne polyurethane-acrylic hybrid copolymer according to claim 28, wherein the aromatic or aliphatic polyol is selected from the group consisting of ethylene glycol, propylene glycol, 1,3 propane diol, 1,3 butylene glycol, 1,4 butane diol, Bisphenol A, trimethylol propane, trimethylol ethane, pentaerythritol, glycerin, neopentyl glycol, and cyclohexane dimethanol, and mixtures thereof.

30. The air curable water-borne polyurethane-acrylic hybrid copolymer according to claim 28, wherein the unsaturated fatty acid is selected from the group consisting of linoleic, palmitoleic, linolenic, eleostearic, arachidonic, ricinoleic acids, 10,12-octadecadienoic acid and mixtures thereof.

31. The air curable water-borne polyurethane-acrylic hybrid copolymer according to claim 20, wherein the air curable ethylenic unsaturation is provided by transesterification of an oil with an aromatic or aliphatic polyol containing at least two hydroxyl groups per molecule.

32. The air curable water-borne polyurethane-acrylic hybrid copolymer according to claim 31, wherein the aromatic or aliphatic polyol is selected from the group consisting of ethylene glycol, proplylene glycol, 1,3 propane diol, 1,3 butylene glycol, 1,4 butane diol, Bisphenol A, trimethylol propane, trimethylol ethane, pentaerythritol, glycerin, neopentyl glycol, and cyclohexane dimethanol, and mixtures thereof.

33. The air curable water-borne polyurethane-acrylic hybrid copolymer according to claim 31, wherein the oil is selected from the group consisting of linseed oil, soybean oil, safflower oil, tall oil, sunflower oil, dehydrated caster oil, tung oil, sardine oil, olive oil, cottenseed oil and mixtures thereof.

34. The air curable water-borne polyurethane-acrylic hybrid copolymer according to claim 20, wherein the one or more vinyl monomers containing both active hydrogen and vinyl functionality are selected from the group consisting of hydroxy functional acrylates and methacrylates, amides, and amino functional acrylates, methacrylates and mixtures thereof.

35. The air curable water-borne polyurethane-acrylic hybrid copolymer according to claim 20, wherein the vinyl monomer inert to isocyanate functionality is selected from the group consisting of acrylic acid, methacrylic acid, ethyl acrylate, butyl acrylate, methyl methacrylate, ethyl methacrylate, butyl methacrylate, acrylamide, methylacrylamide, styrene and vinyl toluene.

36. The air curable water-borne polyurethane-acrylic hybrid copolymer according to claim 20, wherein reaction of the vinyl groups by free radical polymerization includes the addition of an azo compound.

37. A dual curable water-borne polyurethane-acrylic hybrid formed by:
(a) blending a polyurethane prepolymer having
  (i) acid or amine salt forming groups,
  (ii) air curable ethylenic unsaturation and
  (iii) terminal isocyanate groups, with one or more vinyl monomers inert to isocyanate functionality a portion of which containing ketone functionality and dihydrazide groups;
(b) dispersing the prepolymer/acrylic monomer blend into water,
(c) reacting the dispersed prepolymer with an excess of dihydrazide groups; and
(d) reacting the vinyl monomer by free radical polymerization.

38. The dual curable water-borne polyurethane-acrylic hybrid according to claim 37, wherein the prepolymer diisocyanate is selected from the group consisting of 1,4-tetramethylene diisocyanate, 1,6-hexamethylene diisocyanate, 2,2,4-trimethyl-1,6-dissocyanatohexane, 1,10-decamethylene diisocyanate, 1,4-cyclohexylene diisocyanate, bis (4-isocyanatocyclohexyl) methane, 1-isocyanato-3-isocyanatomethyl-3,5,5-trimethyl-cyclohexane, m- and p-phenylene dissocyanate, 2,6- and 2,4-tolylene diisocyanate, xylene diisocyanate, 4-chloro-1,3-phenylene diisocyanate, 4,4'-biphenylene diisocyanate, 4,4'-methylene diphenylisocyante, 1,5-naphthylene diisocyanate, 1,5-tetrahydronaphthylene diisocyanate, polymethylene polyphenylisocyanates, 1,12-dodecyl diisocyanate, norbornane diisocyanate, 2-methyl-1,5-pentane diisocyanate and mixtures thereof.

39. The dual curable water-borne polyurethane-acrylic hybrid according to claim 37, wherein the acid salt forming group is introduced into the prepolymer by a compound containing active hydrogen and active acid groups neutralized by a neutralizing base.

40. The dual curable water-borne polyurethane-acrylic hybrid according to claim 39, wherein the compound containing active hydrogen and active acid groups is selected from the group consisting of hydroxy and mercapto carboxylic acids, aminocarboxylic acids, aminohydroxy carboxylic acids, sulfonic acids, hydroxy sulfonic acids and aminosulfonic acids.

41. The dual curable water-borne polyurethane-acrylic hybrid according to claim 39, wherein the neutralizing base is an organic or inorganic base selected from the group consisting of sodium hydroxide, potassium hydroxide, lithium hydroxide, ammonia or organic bases such as tertiary amines like triethylamine and dimethyl ethanol amine.

42. The dual curable water-borne polyurethane-acrylic hybrid according to claim 37, wherein the amine salt forming group is introduced into the prepolymer by a compound containing active hydrogens and active basic groups neutralized by a neutralizing acid.

43. The dual curable water-borne polyurethane-acrylic hybrid according to claim 42, wherein the compound containing active hydrogen groups and active basic groups is selected from aliphatic, cycloaliphatic and hetercyclic amino alcohols, diols and triols, amines, diamines, triamines, tetramines and amides.

44. The dual curable water-borne polyurethane-acrylic hybrid according to claim 42, wherein the neutralizing acid is an organic or inorganic acid selected from the group consisting of formic acid, acetic acid, hydrochloric acid and sulfuric acid.

45. The dual curable water-borne polyurethane-acrylic hybrid according to claim 37, wherein the air curable ethylenic unsaturation is provided by an ester polyol made by reaction of an aromatic or aliphatic polyol containing at least two hydroxyl groups per molecule with a fatty acid wherein a portion of the fatty acid is unsaturated.

46. The dual curable water-borne polyurethane-acrylic hybrid according to claim 45, wherein the aromatic or aliphatic polyol is selected from the group consisting of ethylene glycol, proplylene glycol, 1,3 propane diol, 1,3 butylene glycol, 1,4 butane diol, Bisphenol A, trimethylol propane, trimethylol ethane, pentaerythritol, glycerin, neopentyl glycol, and cyclohexane dimethanol, and mixtures thereof.

47. The dual curable water-borne polyurethane-acrylic hybrid according to claim 45, wherein the unsaturated fatty acid is selected from the group consisting of linoleic, palmitoleic, linolenic, eleostearic, arachidonic, ricinoleic acids, 10,12-octadecadienoic acid and mixtures thereof.

48. The dual curable water-borne polyurethane-acrylic hybrid according to claim 37, wherein the air curable ethylenic unsaturation is provided by transesterification of an oil with an aromatic or aliphatic polyol containing at least two hydroxyl groups per molecule.

49. The dual curable water-borne polyurethane-acrylic hybrid air curable water-borne polyurethane according to claim 48, wherein the polyol is selected from the group consisting of ethylene glycol, proplylene glycol, 1,3 propane diol, 1,3 butylene glycol, 1,4 butane diol, Bisphenol A, trimethylol propane, trimethylol ethane, pentaerythritol, glycerin, neopentyl glycol, and cyclohexane dimethanol, and mixtures thereof.

50. The dual curable water-borne polyurethane-acrylic hybrid according to claim 48, wherein the oil is selected from the group consisting of linseed oil, soybean oil, safflower oil, tall oil, sunflower oil, dehydrated caster oil, tung oil, sardine oil, olive oil, cottenseed oil and mixtures thereof.

51. The dual curable water-borne polyurethane-acrylic hybrid according to claim 37, wherein the dihydrazides are selected from the groups consisting of ethylene-1,2- dihydrazide, propylene-1,3-dihydrazide, propylene-1,4-dihydrazide and adipic dihydrazide.

52. The dual curable water-borne polyurethane-acrylic hybrid according to claim 37, wherein the vinyl monomer inert to isocyanate functionality is selected from the group consisting of acrylic acid, methacrylic acid, ethyl acrylate, butyl acrylate, methyl methacrylate, ethyl methacrylate, butyl methacrylate, acrylamide, methylacrylamide, diacetone acrylamide, styrene, vinyl methyl ketone, vinyl ethyl ketone, diacetone acrylate, vinyl toluene and mixtures thereof.

53. The dual curable water-borne polyurethane-acrylic hybrid according to claim 52 wherein at least 0.5% by weight of the vinyl monomer inert to isocyanate functionality contain a ketone group.

54. The dual curable water-borne polyurethane-acrylic hybrid according to claim 37, wherein reaction of the vinyl groups by free radical polymerization includes the addition of an azo compound.

55. An air curable water-borne polyurethane/acrylic hybrid interpenetrating polymer network formed by:
 (a) blending a polyurethane prepolymer having
  (i) acid or amine salt forming groups,
  (ii) air curable ethylenic unsaturation provided by an ester polyol which is the reaction product of an aromatic or aliphatic polyol containing at least two hydroxyl groups per molecule with a fatty acid wherein a portion of the fatty acid is unsaturated or provided by transesterification of an unsaturated oil with an aromatic or aliphatic polyol containing at least two hydroxyl groups per molecule; and
  (iii) terminal isocyanate groups or both terminal isocyanate groups and terminal vinyl groups, with one or more vinyl monomers, inert to isocyanate functionality;
 (b) dispersing the prepolymer/vinyl monomer blend into water;
 (c) chain extending the terminal isocyanate groups of the prepolymer with one or more active hydrogen containing compounds; and
 (d) reacting the vinyl groups by free radical polymerization.

56. The air curable water-borne polyurethane/acrylic hybrid interpenetrating polymer network according to claim 55, wherein the isocyanate groups are selected from the group consisting of 1,4-tetramethylene diisocyanate, 1,6-hexamethylene diisocyanate, 2,2,4-trimethyl-1,6-dissocyanatohexane, 1,10-decamethylene diisocyanate, 1,4-cyclohexylene diisocyanate, bis (4-isocyanatocyclohexyl) methane, 1-isocyanato-3isocyanatomethyl-3,5,5-trimethyl-cyclohexane, m- and p-phenylene dissocyanate, 2,6- and 2,4-tolylene diisocyanate, xylene diisocyanate, 4-chloro-1,3-phenylene diisocyanate, 4,4'-biphenylene diisocyanate, 4,4'-methylene diphenylisocyante, 1,5-naphthylene diisocyanate, 1,5-tetrahydronaphthylene diisocyanate, polymethylene polyphenylisocyanates, 1,12-dodecyl diisocyanate, norbornane diisocyanate, 2-methyl-1,5pentane diisocyanate and mixtures thereof.

57. The air curable water-borne polyurethane/acrylic hybrid interpenetrating polymer network according to claim 55, wherein the acid salt forming group is introduced into the prepolymer by a compound containing active hydrogen and active acid groups neutralized by a neutralizing base.

58. The air curable water-borne polyurethane/acrylic hybrid interpenetrating polymer network according to claim 57, wherein the compound containing active hydrogen and active acid groups is selected from the group consisting of hydroxy and mercapto carboxylic acids, aminocarboxylic acids, aminohydroxy carboxylic acids, sulfonic acids, hydroxy sulfonic acids and aminosulfonic acids.

59. The air curable water-borne polyurethane/acrylic hybrid interpenetrating polymer network according to claim 57, wherein the neutralizing base is an organic or inorganic base selected from the group consisting of sodium hydroxide, potassium hydroxide, lithium hydroxide, ammonia, triethylamine and dimethyl ethanol amine.

60. The air curable water-borne polyurethane/acrylic hybrid interpenetrating polymer network according to claim 55, wherein the amine salt forming group is introduced into the prepolymer by a compound containing active hydrogens and active basic groups neutralized by a neutralizing acid.

61. The air curable water-borne polyurethane/acrylic hybrid interpenetrating polymer network according to claim 60, wherein the compound containing active hydrogen groups and active basic groups is selected from the groups consisting of aliphatic, cycloaliphatic and hetercyclic amino alcohols, diols and triol, amines, diamines, triamines, tetramines and amides.

62. The air curable water-borne polyurethane/acrylic hybrid interpenetrating polymer network according to claim 60, wherein the neutralizing acid is an organic or inorganic acid selected from the group consisting of formic acid, acetic acid, hydrochloric acid and sulfuric acid.

63. The air curable water-borne polyurethane/acrylic hybrid interpenetrating polymer network according to claim 55, wherein the aromatic or aliphatic polyol is selected from the group consisting of ethylene glycol, proplylene glycol, 1,3 propane diol, 1,3 butylene glycol, 1,4 butane diol Bisphenol A, trimethylol propane, trimethylol ethane, pentaerythritol, glycerin, neopentyl glycol, and cyclohexane dimethanol, and mixtures thereof.

64. The air curable water-borne polyurethane/acrylic hybrid interpenetrating polymer network according to claim 55, wherein the unsaturated fatty acid(s) is selected from the group consisting of linoleic, palmitoleic, linolenic, eleostearic, arachidonic, ricinoleic acids, 10, 12-octadecadienoic acids, and mixtures thereof.

65. The air curable water-borne polyurethane/acrylic hybrid interpenetrating polymer network according to claim 55, wherein the aromatic or aliphatic polyol is selected from the group consisting of ethylene glycol, proplylene glycol, 1,3 propane diol, 1,3 butylene glycol, 1,4 butane diol, Bisphenol A, trimethylol propane, trimethylol ethane, pentaerythritol, glycerin, neopentyl glycol, and cyclohexane dimethanol, and mixtures thereof.

66. The air curable water-borne polyurethane/acrylic hybrid interpenetrating polymer network according to claim 55, wherein the oil is selected from the group consisting of linseed oil, soybean oil, safflower oil, tall oil, sunflower oil, dehydrated caster oil, tung oil, sardine oil, olive oil, cottenseed oil and mixtures thereof.

67. The air curable water-borne polyurethane/acrylic hybrid interpenetrating polymer network according to claim 55, the terminal vinyl groups are provided by one or more vinyl monomers containing both active hydrogen and vinyl functionality.

68. The air curable water-borne polyurethane/acrylic hybrid interpenetrating polymer network according to claim 67, wherein the one or more vinyl monomers containing both active hydrogen and vinyl functionality are selected from the group consisting of hydroxy functional acrylates and methacrylates, amides, and amino functional acrylates and methacrylates.

69. The air curable water-borne polyurethane/acrylic hybrid interpenetrating polymer network according to claim 55, wherein the one or more vinyl monomers inert to isocyanate functionality is selected from the group consisting of acrylic acid, methacrylic acid, ethyl acrylate, butyl acrylate, methyl methacrylate, ethyl methacrylate, butyl methacrylate, acrylamide, methylacrylamide, styrene and vinyl toluene.

70. The air curable water-borne polyurethane/acrylic hybrid interpenetrating polymer network according to claim 55, wherein the active hydrogen containing compounds reacted with the prepolymer terminal isocyanate groups for chain extension are selected from aliphatic, cycloaliphatic and hetercyclic amino alcohols, polyamines, hydrazine, substituted hydrazines, hydrazides, amides, water and mixtures thereof.

71. The air curable water-borne polyurethane/acrylic hybrid interpenetrating polymer network according to claim 55, wherein reaction of the vinyl groups by free radical polymerization includes the addition of an azo compound.

* * * * *